Feb. 3, 1959     E. R. PRICE     2,871,828
POWER-ASSISTED ACTUATOR
Filed Sept. 7, 1954     2 Sheets-Sheet 2
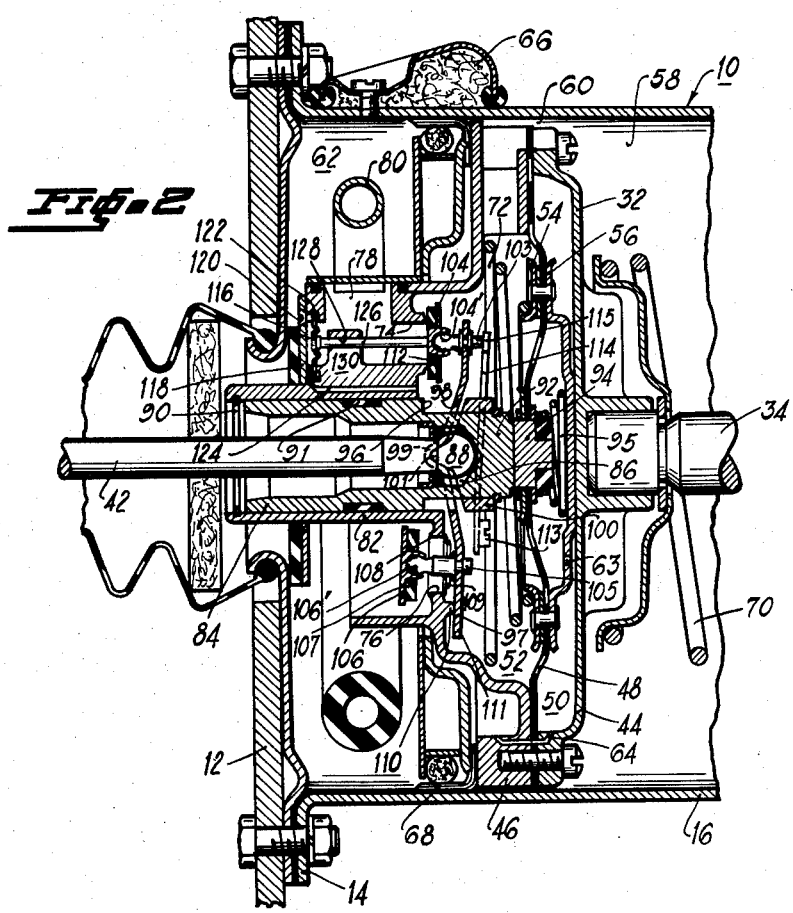
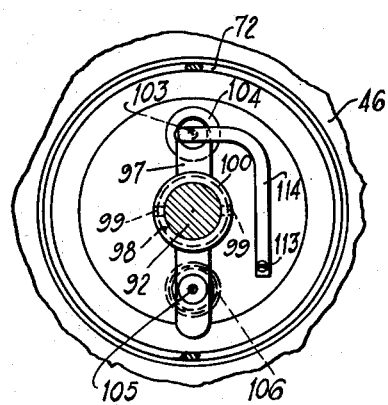
INVENTOR.
EARL R. PRICE
BY
ATTORNEY

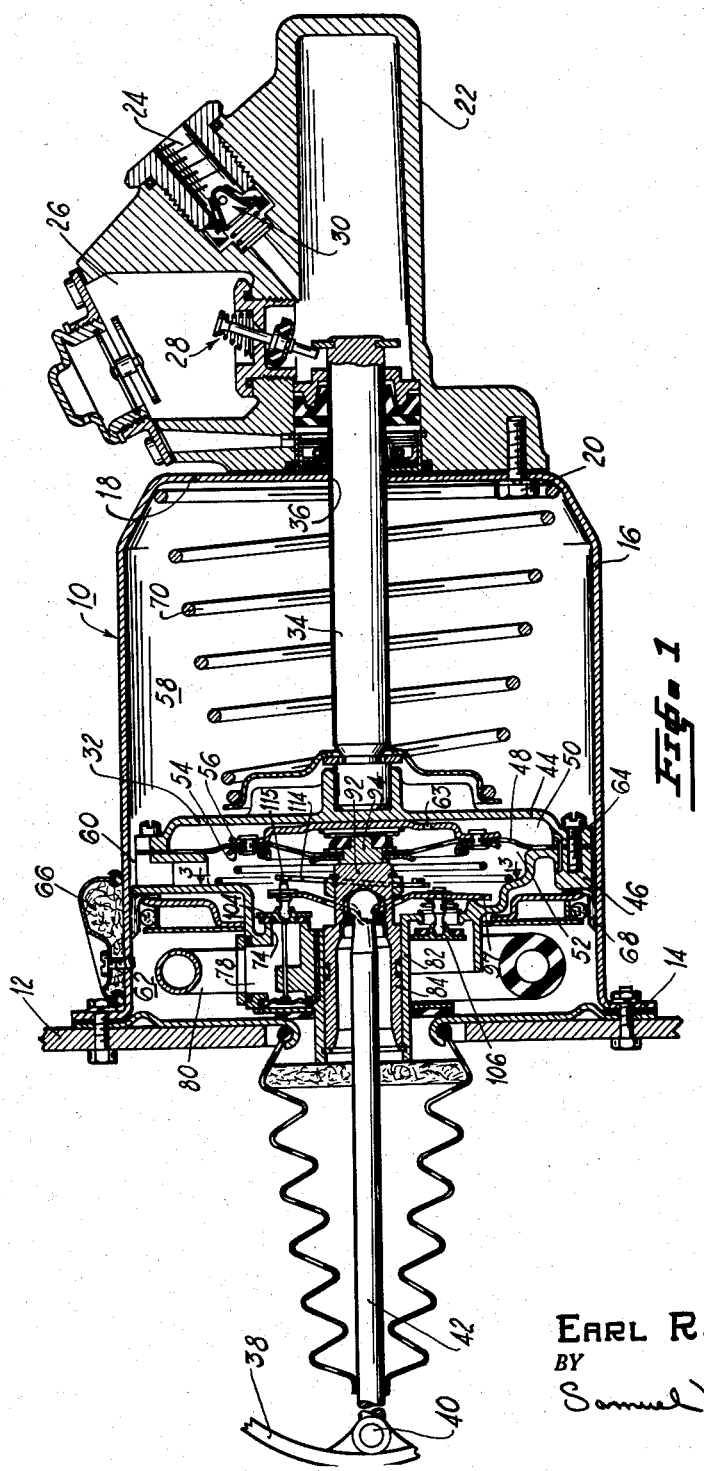

United States Patent Office 2,871,828
Patented Feb. 3, 1959

2,871,828

POWER-ASSISTED ACTUATOR

Earl R. Price, South Bend, Ind., assignor to Bendix Aviation Corporation, South Bend, Ind., a corporation of Delaware Application September 7, 1954, Serial No. 454,797

12 Claims. (Cl. 121—41)

The present invention relates to an improvement in power-assisted actuators, i. e., pressure producing devices in which physical force is supplemented by power assistance. Although the improved actuator has been devised primarily for use in vehicle braking systems, other uses are possible.

This invention constitutes an improvement over my Patent No. 2,685,170, issued August 3, 1954. This patent discloses several embodiments of valve control structure for controlling the movement of a pressure responsive movable wall in a power assisted actuator.

The desirable qualities for control valves utilized in power assisted actuators of the character involved are good seal characteristics, simplicity of operating parts, and smooth and positive actuation. One of the existing problems presented by the utilization of a "slide valve" of the character disclosed in my previously mentioned patent is that leakage will occur between the relatively movable parts since clearances must be provided in order for the parts to move with respect to each other. When "poppet valves" of the character disclosed in my previously mentioned patent have been utilized in power assistors instead of the aforementioned "slide valves," it has been found that due to a pressure differential existing across the poppet valve, a positive force generally exists urging the poppet toward a seated position. Although the existence of such a force improves the seal characteristics of such a poppet valve, it is difficult to control and gives rise to undesirable operational characteristics such as rough operation and lack of "feel" due to sudden changes of pressure across the poppet upon valve actuation resulting from the lack of control of the "crack point" of poppet valves of this type. By substantially balancing the poppet valve structure and by utilizing the minimum of this force urging the poppet valve toward a seated position to maintain good seal characteristics, the difficulties of lack of control and rough operation are herein overcome.

It is, therefore, a principal object of this invention to provide a power-assisted actuator for use in a vehicle braking system, which includes improved valve control structure providing consistency and reliability of operation.

It is another object of this invention to improve the control valve mechanism used in a power-assisted brake device, and specifically to provide a control valve mechanism with improved seal characteristics, smoothness of operation, and simplicity of operating parts.

And another object of this invention is to improve the consistency of operation of the control valve mechanism used in a power-assisted brake device, wherein said control valve mechanism includes sequentially operating valve structure which is substantially balanced due to existing pressure differential and which permits low, smooth initial pedal pressure upon actuation.

And yet another object of this invention is to provide in a power-assisted brake device incorporating substantially balanced valve structure means effective to provide adequate manual braking during "power-off" conditions, and insuring a minimum of valve leak during "power-on" conditions.

Other objects and advantages of this invention will become apparent from a consideration of the following description, taken in connection with the accompanying drawings, wherein an embodiment of this invention is disclosed by way of example.

In the drawings:

Figure 1 is a sectional view of the power-assisted actuator;

Figure 2 is an enlarged view of a portion of Figure 1 disclosing more clearly the valve control structure; and Figure 3 is a partial sectional view on the line 3—3 of Figure 1.

Referring to the drawings, the illustrated power-assisted actuator 10 of this invention is suitably secured to the toeboard of firewall 12 of the vehicle by means of an outwardly extending flange 14 formed on one end of a power cylinder casing 16. On the other end 18 of power cylinder 16 there is secured by suitable means, such as screws 20, a hydraulic cylinder 22 provided with an outlet 24 for connection to the wheel cylinders of a conventional hydraulic brake system, illustrated diagrammatically for example in my previously mentioned patent. A fluid reservoir 26 is in communication with the hydraulic cylinder 22, said communication being controlled by "tilting valve" fluid compensating structure 28, the operation of which is more fully described in my aforementioned patent. The outlet 24 includes therein a residual check valve structure 30 for maintaining a residual line pressure in the brake system. A power piston 32 is reciprocably carried inside power cylinder 16, and a plunger or pressure-transmitting member 34 is co-axially secured to said piston 32 and projects through an opening 36 in power cylinder end 18 and into the hydraulic cylinder 22. Thus it is seen that by movement of piston 32 to the right, plunger 34 is driven more deeply into hydraulic cylinder 22 and displaces fluid through the outlet 24. Movement of the power piston is controlled by means of a treadle 38 which is substantially pivoted on the floor board 12 at the upper end (this connection not being shown), and pivotally connected at the lower end 40 to a connecting rod 42 having an operative connection with piston 32. By depressing treadle 38, the connecting rod 42 will be forced to the right and will in turn cause the movement of piston 32 toward the right, causing plunger 34 to displace liquid from hydraulic cylinder 22. While this particular manual operation is possible, it is not to be confused with the normal desired operation in which the treadle 38 is used to actuate the control valve structure of the power device which will cause actuating movement of piston 32. However, the described manual operation is available during "power-off" conditions in case the power mechanism should fail.

Continuing now with the detailed description of the structure, the piston 32 comprises essentially two sections 44 and 46 which are joined at their outer peripheries in such a manner as to provide an internal piston cavity. A diaphragm 48 is clamped between the two piston sections 44 and 46 in such a manner as to define two variable volume piston compartments 50 and 52. The central portion of the diaphragm 48 is clamped between plate members 54 and 56 and provides a flexible, annular outer peripheral portion which can move relative to piston 32. Compartment 52 is in continuous communication with a power chamber 58 in the front of piston 32, through a passage 60, and compartment 50 is constantly in communication with a rear chamber 62 by means of a restricted opening 63 in plate 56 and a suitable passage 64. Chamber 62 is ported to atmosphere through a suitable air cleaner 66. A suitable seal means such as that shown at 68 is provided on the outer periphery of the piston 32 to prevent leakage between chambers 58 and 62. A power piston return spring 70 is interposed between end 18 of the power cylinder and the power piston 32 and holds said power piston in its leftmost position when the pressures in chambers 58 and 62 are the same.

A counter-reaction spring 72 is interposed between the inner rear portion of piston 32 and diaphragm 48 to bias said diaphragm against the front inner wall portion of piston 32. The structure heretofore described is substantially the same as that described in my co-pending application Serial No. 411,386 filed February 19, 1954, now Patent No. 2,818,710 and concerns principally "two-stage" diaphragm reaction structure. The piston 32 as previously mentioned consists of portions 44 and 46, the portion 46 including two control ports 74 and 76. The port 74 is in communication with a vacuum valve chamber 78 to which a flexible hose 80 is connected; this flexible hose 80 is in communication with a source of vacuum such as the engine manifold (not shown). The port 74 also communicates with compartment 52 and chamber 58 through passage 60. The port 76 is in communication with chamber 62 and compartment 52. The piston portion 46 also includes an integral sleeve portion 82, which has slidably mounted therein valve control plunger means 84 which includes a recess 86 in which the end 88 of rod 42 is suitably secured. The valve control plunger means is retained in a sleeve portion 82 by means of retainer ring 90. Suitable seal means 91 is provided between the relatively movable sleeve parts 82 and plunger means 84.

The plunger means 84 includes a reduced diameter portion 92 which is operatively associated with a portion 94 of the reaction diaphragm and thus a pressure differential across the diaphragm urging the same toward the left would result in a reaction being felt by the operator of the device through rod 42 in the same manner as more fully described in my previously mentioned Patent No. 2,818,710. Interposed between portion 94 and the adjacent side of member 56 is a valve spring 95 which urges the valve control assembly toward an unactuated position. The reduced portion 92 of the valve control plunger means 84 includes a shoulder or stepped down portion 96.

Mounted on portion 92 of the valve control plunger means 84 is a spring steel, freely pivotable valve carrying member or "walking beam" 97, which includes two extending centrally located leg portions 99 (only one being shown) which engages shoulder 96 of member 84. The central portion of member 97 has a central aperture 98 through which portion 92 extends and which is of a diameter larger than the portion 92 upon which it is mounted. Axially spaced from the shoulder 96 on portion 92 for the purpose of pivotally retaining member 97 on portion 92, is a suitably mounted pivot washer 100. Accordingly said member 97 will have free pivotal movement on portion 92 limited by the size of said central aperture 98 and the location of the pivot washer 100. The pivot washer 100 includes pivot or leg portions 101 (only one being shown) in pivotal engagement with the inner side of pivotal leg portions 99 of the valve carrying member 97.

Mounted on each end of member 97, in any suitable manner, are valve element carrying pin members 103 and 105, which respectively carry poppet valve members 104 and 106, said poppet valve members being effective to control the fluid flow through ports 74 and 76. The poppet valve members 104 and 106 are swivelly mounted in sockets 104' and 106' of the valve members for free pivotal movement on the pin members 103 and 105, respectively, to insure proper seating on the valve seats controlling ports 74 and 76, as will be subsequently described. Each poppet valve member includes a resilient sealing means 107 affixed thereon. The poppet 106 cooperates with a valve seat 108 surrounding port 76 to seal off communication between chambers 62 and 52 through port 76. Interposed between the side of member 46 opposite the valve seat 108, and the adjacent side of valve carrying member 97, is a relatively light coil biasing spring member 109 surrounding pin 105 which tends to urge poppet 106 toward its seated position on valve seat 108. Member 46 also includes an abutment 110 located in the pivotal path of member 97 which is operative to abut the lower end portion 111 thereof.

The poppet valve member 104 cooperates with a valve seat 112 surrounding control port 74 and controls communication through port 74 between vacuum valve chamber 78 and compartment 52.

Secured to the inner side of piston portion 46 by means of a screw 113 is a biasing leaf spring member 114, as best seen in Figure 3. The spring member is offset with respect to the center of the power piston and portion 92 of the valve control means 84, and is in constant contact with end 115 of the pin member 103, serving to provide a residual biasing force tending to urge poppet 104 toward the seated position.

Spring members 109 and 114 have a dual function in their cooperation with the respective poppets 106 and 104. First, during actuation of the power assistor when a source of power is available there will result a pressure-differential on the power piston and rightward movement thereof. As viewed in the drawings, it will be observed that since the valve seat 112 moves with said power piston, and poppet 106 is caused to be seated on valve seat 108, the two poppets may reach a position which would be termed a "lapped" condition. When this occurs, the valve supporting structure 97 may be substantially balanced on its pivot legs 99 and a condition might occur where there is insufficient force urging either of the poppets toward their respective valve seats. In the absence of the biasing springs, due to the possibility of the aforementioned balanced condition of the two poppets occurring during a lapped position, it is possible that the poppets might move from their valve seats to be inadequately seated causing an objectionable vacuum leak through port 74 to port 76. Second, during the "power-off" condition or manual actuation, i. e. during an engine failure etc., if the biasing springs were not present, when the valve spring 95 is overcome due to operator's effort on rod 42, member 97 could become free floating and both of the poppets might come into a position where they are off their respective valve seats. When this condition occurs, upon restarting the engine and the existence of manifold pressure, it is possible that a direct leak to the atmosphere chamber 52 might occur through port 74, chamber 52 and port 76, without resulting in a build up of vacuum in chambers 52 and 58. Thus the biasing springs 109 and 114 are operative to insure positive seating of the valve poppets during power and manual actuation to provide what might be termed a residual or anchoring force, positively urging the poppets toward their seated position.

The functioning of the two biasing springs may be described as a "residual force overlap" which presents a constant positive force urging the poppets toward their valve seats. Considering the position of the valve structure shown in Figures 1 and 2, it will be noted that spring 109 is compressed after the lower portion 111 of member 97 contacts abutment 110 when plunger 84 is urged to its leftmost position. For the purpose of this explanation, it may be assumed that springs 109 and 114 are each designed to exert three ounces of residual force on the respective poppets when the poppets are seated. Upon actuation, as the plunger 84 is moved toward the right, the amount of force compressing spring 109 is transferred to spring 95 and poppet 106 is moved into a position where it just contacts its valve seat 108. At this time spring 109 exerts no force, and spring 114 exerts three ounces of force. As the plunger 84 is continued in its rightward movement, and the pivot point of valve carrying member 97 starts to change from poppet 104 to poppet 106, the force of spring 114 is overcome and the force of spring 109 becomes effective; when the force of each of the springs 109 and 114 exert only one and one-half ounces, the valve carrying member 97 will have assumed a substantially balanced position.

It is thus to be observed that each of the poppets are still urged toward a seated position due to the one and one-half ounce of force due to the biasing springs and this force resulting in positive seating of the poppets. Further movement of member 84 toward the right, causes the pivot point of member 97 to be at the poppet 106, and spring 109 is permitted to exert the entire three ounces of force thereon. Thus it is seen that during the transition or change of pivots of the valve carrying member 97, a "residual force overlap" occurs wherein each of the poppets are urged toward their respective seats due to the force of the residual biasing springs.

The side of vacuum valve chamber 78 opposite port 74 includes a poppet balancing chamber 116 which is formed between a plate member 118 secured on the end of piston portion 46 by means of a screw 120, for example, and a movable wall or diaphragm member 122 formed of rubber or any other suitable material. The chamber 116 is in constant communication with compartment 52 through a passage 124 formed in piston portion 46. Interposed between diaphragm 122 and poppet member 104 is a reciprocably mounted pin member 126 of a predetermined length, carried in a bore 128 of a support portion 130 in the chamber 78. In the position illustrated, it is to be observed that the poppet 104 closes off port 74 and vacuum exists in chamber 78, since compartment 52 is in communication with the atmosphere, and as previously mentioned, there is a pressure-differential across said poppet 104 which urges it towards its valve seating position. The force urging said poppet toward its seated position must be overcome, and the instant this force is overcome there is a sudden equalizing or drop in pressure across the poppet. The sudden equalization of forces on the poppet is undesirable and causes a rough operating control valve. It is desirable to reduce the amount of force necessary to "crack" the valve upon actuation, to enable the operator to have a greater degree of control thereover. Inasmuch as the chamber 116 is in constant communication with compartment 52, through passage 124, a pressure differential of equal value to that across poppet 104 will exist over diaphragm 122. However, the force caused by the pressure differential across the diaphragm 122 acts opposite to the pressure differential force on the poppet 104. By interposing the pin 126 between diaphragm 122 and poppet 104 it is possible to utilize the force exerted by the diaphragm member 122 on pin 126 to urge the poppet 104 toward an unseated position. The pin 126 is maintained in abutting relationship with diaphragm 122 and poppet 104 so that balancing force is properly transmitted. The relative size, or effective area of the diaphragm 122 as compared with the effective area of the poppet 104, is always made less than that of poppet 104 in order that there is always available a slight aggregate differential pressure across said poppet 104 urging it toward the seated position. The residual force of the biasing spring 114, must also be overcome; however this is relatively light in order to provide its previously mentioned function.

To state the "balanced poppet" function in another manner, it might be said that since both diaphragm 122 and poppet 104 are subject to the same pressure differential between chamber 52 and chamber 78, the difference of the force exerted on these two members due to said pressure differential will be dependent upon their relative effective areas. Since these two members are located on opposite sides of the vacuum valve chamber 78 the force of the pressure differential thereacross will urge them in opposite directions, and if they were of equal area there would be equal forces exerted on them both. By inserting the pin 126 between the diaphragm 122 and poppet 104, an operative connection is formed between these two members, and the diaphragm will tend to urge the poppet off the valve seat 112. By choosing a diaphragm 122 which has a relatively smaller effective area over which the pressure differential acts, than the same effective area of the poppet 104, it is possible to nearly balance out all of the force exerted on the poppet 104 tending to seat the same. It is not desirable to completely balance the poppet 104 inasmuch as the poppet will then no longer be effective to perform its sealing function.

Operation of the device is as follows:

The treadle 38 is depressed causing forward movement of plunger 84. In the released or non-actuated condition, as shown in the drawings, poppet 104 is seated on valve seat 112 in a semi-balanced condition by virtue of the force exerted by diaphragm 122. Movement of the plunger 84 causes the member 97 to pivot about the end carrying poppet 104, carrying with it at the lower end of the poppet 106 which moves towards its valve seat 108. Continued rightward movement of the plunger 84 causes poppet 106 to seat and then this poppet, by virtue of its swivel connection acts as the pivot of member 97 and poppet 104 is moved from its seat 112. The effort or force required to unseat poppet 104 is relatively light and hardly felt by the operator through rod 42 and treadle 38 by virtue of the balanced condition of poppet 104. When poppet 106 became seated on its valve seat 108, communication between chamber 62 and compartment 52 was interrupted, and by virtue of the continued movement toward the right of the plunger 84 and the unseating of poppet 104 and compartment 52 was brought into communication with vacuum chamber 78. Thus since compartment 52 is in communication through passage 60 with chamber 58, a pressure differential exists across the pressure responsive movable wall or power piston 32 and force is exerted through the thrust rod 34, resulting in fluid being forced to the vehicle brake system through outlet 24. Inasmuch as chamber 50 remains in communication with chamber 62 through passage 64, the diaphragm structure contained in the power piston reacts against the operator's force apprizing him of the amount of effort exerted in the vehicle brake system, as clearly set forth and described in my previously mentioned Patent No. 2,818,710.

Inasmuch as the valve seat 112 is an integral part of the piston portion 46 of the pressure responsive movable wall 32, the valve structure has the usual follow-up action wherein the valve seat 112 will be urged into contact with poppet 104 when the power piston moves toward the right, with poppet 106 remaining seated on seat 108 and thus the valve approaches a "lapped" condition. In this condition biasing springs 109 and 114 are effective to maintain proper seating of the valve poppets. The light valve return spring 95 upon removal of operator's pressure on the treadle 38, urges valve plunger member 84 toward the left and causes poppet member 104 to reseat on its valve seat 112. Thus the poppet 104 becomes the pivot for member 97, which might be referred to as a "walking beam," and continued leftward movement of plunger 84 results in the unseating of poppet 106 which is urged off its valve seat 108 again permitting atmospheric communication between chamber 62 and compartment 52. During this "leftward movement" when portion 111 of member 97 comes in contact with abutment portion 110, the point of contact of these members becomes a pivot point for the member 97 and any continued pivotal movement of member 97 due to the force of valve return spring 95 urges the poppet 104 into tighter seating relationship with its valve seat 112 to insure a positive seal between vacuum chamber 78 and compartment 52. Release of pressure on the treadle 38 results in the spring 70 urging the pressure responsive movable wall 32 to its leftmost illustrated position.

As previously mentioned, seal means 91 is provided between plunger 84 and portion 82 of the piston element 46. This seal is effective to retain the vacuum in compartment 52 when poppet 104 is unseated and also whenever the unit is in applied condition with a partial vacuum in chamber 52.

It is to be observed that this power-assisted actuator has been illustrated as being "atmosphere suspended" and therefore chamber 62 could be left open to the atmosphere, however, a flexible sealing member and filter means are applied about rod 42 and on the rear end of the cylinder 16 to prevent entrance of any foreign matter in the power actuator.

In the foregoing specification and the appended claims, the identified terms are used to convey meanings which include the range of equivalent elements. For example, the term "power cylinder" is intended to include any chamber or cylinder having a pressure responsive member movable therein; this pressure responsive member could readily be a piston, diaphragm or any other such member having a comparable function. The terms "front" and "rear" or any other directional terms are intended to have only a relative connotation to aid in describing the device and are not intended to be interpreted as requiring any particular orientation with any external elements.

Although a particular embodiment of the invention has been illustrated and described other changes and modifications will be apparent to those skilled in the art. All changes and modifications falling within the scope of the claims are intended to be claimed.

I claim:

1. In a fluid pressure device comprising a power cylinder having a pressure responsive movable wall reciprocable therein, said wall having a hollow interior, means dividing said interior into first and second differential pressure chambers, the first chamber being in communication with the rear of said wall and the second chamber being in communication with the front of said wall, a valve control member reciprocably mounted on the rear of said wall, valve means operatively associated with said valve member and carried by said reciprocable wall to control the pressure-differential across said wall, said valve means including two valve seats on said movable wall, a pivotal element pivotally mounted on said valve control member, two valve elements pivotally mounted on said pivotal element, yieldable means on said movable wall associated with said valve elements to urge the valve elements toward a seated position, said valve control member being operative, through said pivotal element, to successively seat and unseat each of the valve elements on their respective valve seats for controlling the pressure differential across said pressure responsive movable wall, and means consisting of a third chamber in communication with said second chamber and including a pressure responsive diaphragm therein subject to the same pressure as that in said second chamber, and an operative connection between said pressure responsive diaphragm and one of said valve elements wherein said valve element is urged toward an operative position.

2. A fluid pressure servo-motor comprising a power chamber provided with a movable wall having a valve chamber therein, a second movable wall in said valve chamber dividing said valve chamber into first and second opposed chambers, valve means including a valve poppet member controlling fluid flow between said second opposed chamber and said power chamber, force transmitting means operatively connecting said second movable wall and said valve poppet member, means providing fluid flow communication between said first opposed chamber and said power chamber, and spring means biasing said valve poppet member to its valve closing position, whereby pressure forces across said poppet member are substantially balanced by said second movable wall and said spring means provides a generally constant seating force for said poppet.

3. A fluid pressure servo-motor comprising a movable wall having a pair of valve seats facing in opposite directions, a valve closure member for each valve seat, a valve control member movable relative to said movable wall, a walking beam operatively connected to said valve closure members and pivotally connected to said valve control member intermediate said valve closure members, a spring for each valve closure member biasing it towards its respective valve seat, and means biasing said valve control member to a position causing said walking beam to open one of said valves against its spring.

4. A fluid pressure servo-motor comprising a movable wall having a pair of valve seats facing in opposite directions, a valve closure member for each valve seat, a valve control member movable relative to said movable wall, a walking beam connected to said valve closure members and pivotally connected to said valve control member intermediate said valve closure members, a spring for each valve closure member biasing it towards its respective valve seat, means biasing said valve control member to a position causing said walking beam to open one of said valves against its spring, and an abutment surface carried by said movable wall for engagement with said walking beam to provide a fulcrum therefor, whereby said means applies additional force tending to seat the other of said valves.

5. A fluid pressure servo-motor comprising a movable wall having a pair of valve seats facing in opposite directions, a valve closure member for each valve seat, a valve control member movable relative to said movable wall, a walking beam operatively connected to said valve closure members and pivotally connected to said valve control member intermediate said valve closure members, a spring for each valve closure member biasing it towards its respective valve seat, means biasing said valve control member to a position causing said walking beam to open one of said valves against its spring, and an abutment surface carried by said movable wall for engagement with a portion of said walking beam positioned outwardly of said one of said valves whereby said last mentioned means applies additional force tending to seat the other of said valves.

6. A fluid pressure servo-motor comprising a power chamber having a movable wall, a pair of valve seats facing in opposite directions on said movable wall, a valve closure member for each valve seat, one of said valve seats and closure members controlling flow communication between said valve chamber and said power chamber, a second movable wall in said valve chamber, one side of said second movable wall being subjected to the pressure in said valve chamber, force transmitting means operatively connecting said second movable wall and the valve closure member controlling flow communication between said chambers, valve control structure operatively connected to said valve closure members for positioning said members, and spring means biasing said valve control structure in a direction to normally lift one of said closure members from its valve seat.

7. A fluid pressure servo-motor comprising a power chamber having a movable wall, a pair of valve seats facing in opposite directions on said movable wall, a valve closure member for each valve seat, one of said valve seats and closure members controlling flow communication between said valve chamber and said power chamber, a second movable wall in said valve chamber, one side of said second movable wall being subjected to the pressure in said valve chamber, force transmitting means operatively connecting said second movable wall and the valve closure member controlling flow communication between said chambers, valve control structure operatively connected to said valve closure member for positioning said members, spring means biasing one of said valve closure members toward its valve seat, and spring means biasing said valve control structure in a direction to lift said one of said closure members from its valve seat and normally hold it in an open position.

8. A fluid pressure servo-motor comprising a power chamber having a movable wall, a pair of valve seats facing in opposite directions on said movable wall, a valve closure member for each valve seat, one of said valve seats and closure members controlling flow communication between said valve chamber and said power chamber, a second movable wall in said valve chamber, one side of said second movable wall being subjected to the pressure in said valve chamber, force transmitting means operatively connecting said second movable wall and the valve closure member controlling flow communication between said chambers, valve control structure operatively connected to said valve closure members for positioning said members, a spring for each of said closure members biasing it toward its valve seat, and spring means biasing said valve control structure in a direction to lift one of said closure members from its valve seat, said spring means being strong enough to overcome the spring of said last mentioned one of said closure members and normally hold it in its open position.

9. A fluid pressure servo-motor comprising a power chamber having a movable wall, a pair of valve seats facing in opposite directions on said movable wall, a valve closure member for each valve seat, one of said valve seats and closure members controlling flow communication between said valve chamber and said power chamber, a diaphragm in said valve chamber, one side of which diaphragm is subjected to the pressure in said valve chamber, force transmitting means operatively connecting said diaphragm and the valve closure member controlling flow communication between said chambers, valve control structure operatively connected to said valve closure members for positioning said members, a spring for each of said closure members biasing it toward its valve seat, and spring means biasing said valve control structure in a direction lifting the other of said closure members from its valve seat, said spring means being strong enough to normally hold said other of said closure members from its valve seat.

10. A fluid pressure servo-motor comprising a cylinder chamber provided with a movable wall having a valve chamber therein, said movable wall having a normal position in said cylinder chamber and forming one end of a variable volume chamber to which said valve chamber is communicated to cause said movable wall to move out of its normal position, valve means including a valve poppet member controlling communication between said valve chamber and said variable volume chamber, a second movable wall adjacent said poppet member, the adjacent sides of said second movable wall and said poppet member being subject to the pressure in said valve chamber, and the opposite sides of said second movable wall and poppet member being subject to the pressure in said variable volume chamber to produce forces which oppose each other, and force transmitting means operatively connecting said second movable wall to said valve poppet member, said second movable wall being sized to deliver a force to said force transmitting means of approximately the same intensity as the opposing force delivered thereto by said poppet member.

11. A fluid pressure servo-motor comprising a cylinder chamber provided with a movable wall having a valve chamber therein, said movable wall having a normal position in said cylinder chamber and forming one end of a variable volume chamber to which said valve chamber is communicated to cause said movable wall to move out of its normal position, valve means including a valve seat facing outwardly of said valve chamber and a valve poppet member for abutting said valve seat to control communication between said valve chamber and said variable volume chamber, a second movable wall spaced on the opposite side of said valve seat from said poppet member, said second movable wall being subject on its side adjacent said poppet member to the pressure of said valve chamber and subject to the pressure in said variable volume chamber on its opposing side to produce a force which opposes the pressure force across said poppet member, and a rod operatively connecting said second movable wall to said valve poppet member, said second movable wall being sized to deliver a force to said rod of approximately the same intensity as the force delivered thereto by said poppet member.

12. A fluid pressure servo-motor comprising a cylinder chamber provided with a movable wall having a valve chamber therein which is supplied with a pressure fluid at a first generally predetermined pressure level, said movable wall having a normal position in said cylinder chamber and forming one end of a variable volume chamber to which said valve chamber is communicated to cause said movable wall to move out of its normal position, valve means including a valve poppet member controlling communication between said valve chamber and said variable volume chamber to thereby establish a second varying pressure level in said variable volume chamber, a second movable wall adjacent said poppet member, the adjacent sides of said second movable wall and said poppet member being subject to one of said pressure levels, and the opposite side of said second movable wall and poppet member being subject to the other of said pressure levels to produce forces which oppose each other, and force transmitting means operatively connecting said second movable wall to said valve poppet member, said second movable wall being sized to deliver a force to said force transmitting means of approximately the same intensity as the opposing force delivered thereto by said poppet member.

References Cited in the file of this patent

UNITED STATES PATENTS

| | | |
|---|---|---|
| 2,341,502 | Ingres | Feb. 8, 1944 |
| 2,411,458 | Penrose | Nov. 19, 1946 |
| 2,421,726 | Thomas | June 3, 1947 |
| 2,685,170 | Price | Aug. 3, 1954 |
| 2,690,740 | Hupp | Oct. 5, 1954 |
| 2,735,268 | Stelzer | Feb. 21, 1956 |
| 2,745,383 | Hupp | May 15, 1956 |